(No Model.)

G. W. HARRINGTON.
FITTING FOR CONNECTING LENGTHS OF PIPE.

No. 520,988. Patented June 5, 1894.

WITNESSES:

INVENTOR

UNITED STATES PATENT OFFICE.

GEORGE W. HARRINGTON, OF WAKEFIELD, MASSACHUSETTS.

FITTING FOR CONNECTING LENGTHS OF PIPE.

SPECIFICATION forming part of Letters Patent No. 520,988, dated June 5, 1894.

Application filed August 31, 1891. Serial No. 404,274. (No model.)

*To all whom it may concern:*

Be it known that I, GEORGE W. HARRINGTON, of Wakefield, in the county of Middlesex and State of Massachusetts, have invented certain new and useful Improvements in Fittings for Connecting Lengths of Pipe, of which the following is a specification.

This invention relates to devices used to connect two or more lengths of iron pipe that are arranged at different angles, said devices including what are known as elbows, T's, crosses and the like.

The invention has for its object to provide fittings of this class composed of an outer portion or body of hard metal and a lining of lead securely engaged with the hard metal body and disposed so that its ends will constitute lead packings formed to bear on the ends of the lengths of pipe.

The invention consists in a fitting composed of a hard metal casing having internal shoulders formed at the inner ends of its pipe-receiving sockets and a lining covering the inner surface of the conducting way or ways extending between the sockets, the ends of said lining being turned outwardly on said shoulders and constituting lead washers or packings, as I will now proceed to describe.

Figure 1:
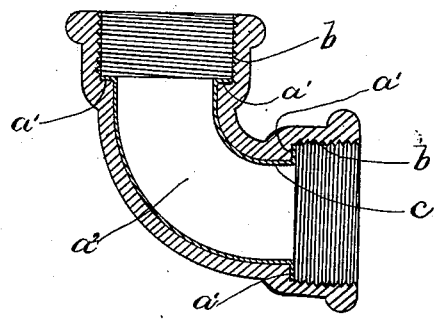
Figure 2:
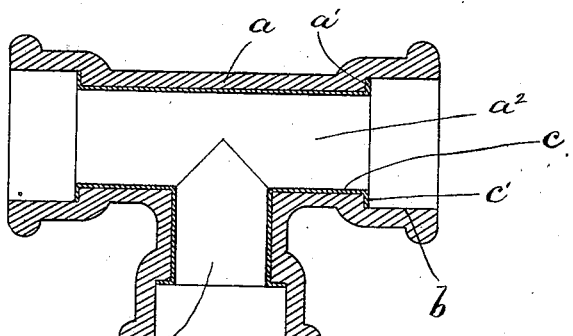
Figure 3:
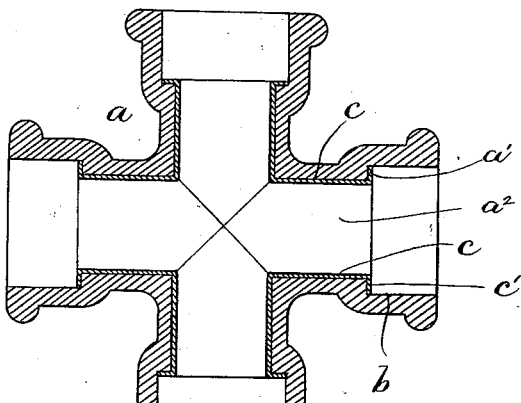

In the accompanying drawings forming a part of this specification, Figures 1, 2 and 3 represent sectional views of different fittings embodying my invention, Fig. 1 showing an elbow, Fig. 2 a T, and Fig. 3 a cross.

The same letters of reference indicate the same parts in all of the figures.

In carrying out my invention I form a hard metal body or casing $a$, by casting or otherwise, having at its ends sockets $b$ for the reception of the ends of lengths of pipe, said sockets having internal screw threads extending from the outer ends of the sockets to shoulders $a'$ which extend inwardly from the inner ends of the screw threaded portions and constitute abutments or stops against which the ends of the lengths of pipe connected by the fitting bear when the pipe is screwed to place in the sockets. There is a shoulder $a'$ at the inner end of each socket and said shoulders are of such width that they correspond with the thickness of the walls of the lengths of pipe inserted in the sockets, so that the way or conduit $a^2$ extending through the fitting is of the same diameter as the interior of the pipes connected by the fitting.

$c$ represents a lining of lead which is applied to and closely fits the way or conduit $a^2$ and is turned outwardly at its ends upon the shoulders $a'$ to form washers or packings $c'$ covering said shoulders and serving to maintain water tight joints between the shoulders and the ends of the lengths of pipe inserted in the sockets, thus preventing the admission of water to the screw threaded portions of the sockets, said portions having no lead coverings or linings. The lead linings may be applied in any suitable way, preferably by a spinning process, the lead being introduced in the form of a tube and in a cold condition into the casing $a$ and then expanded by a suitable tool so that it is closely pressed against and intimately associated with the internal surface of the portion of the casing containing the way or conduit $a^2$. In lining a curved elbow such as is shown in Fig. 1, a piece of curved lead pipe of suitable diameter may be inserted in the way $a^2$ and expanded therein by means of a rotary expanding head or tool mounted on a flexible shaft. Or the lining may be cast in its place and afterward expanded or pressed outwardly to secure it firmly to the fitting.

In lining a T such as is shown in Fig. 2, a piece of lead pipe may be inserted in the main portion of the T and expanded therein, a portion of the lead pipe covering the branch of the T. Said portion may be perforated and spun in such manner as to line said branch so that a seamless lining covering the interior of the way or conduit through both the main portion and the branch will be formed. The cross shown in Fig. 3 may be lined in the same way as the T, a straight pipe being inserted in two of the branches and after being spun to place the portions covering the other two branches may be perforated and spun outwardly into said branches. It will be seen that by this construction a fitting is produced which has a durable and effective lead lining protecting the hard metal portion from oxidation and other chemical actions, and preventing the formation of deposits and incrustations on their inner surfaces.

I claim—

A fitting of the class described, composed of a hard metal casing or body having enlarged pipe receiving sockets at its ends whereby shoulders are formed projecting outwardly from the said body portion, and a lead lining applied to the portion or portions of the inner surface of the casing between said sockets and turned outwardly at its ends into the said sockets upon said shoulders to form lead packings or washers within the said sockets integral with said lining of the casing, the fitting and lining being entirely free from inwardly projecting obstructions, whereby a passageway of uniform diameter is formed, as set forth.

In testimony whereof I have signed my name to this specification, in the presence of two subscribing witnesses, this 27th day of August, A. D. 1891.

GEORGE W. HARRINGTON.

Witnesses:
C. F. BROWN,
A. D. HARRISON.